United States Patent

Mueller

[15] 3,687,416
[45] Aug. 29, 1972

[54] ROTARY PLUG VALVE

[72] Inventor: Frank H. Mueller, 71 Montgomery Pl., Decatur, Ill. 62522

[22] Filed: Nov. 30, 1970

[21] Appl. No.: 93,919

Related U.S. Application Data

[62] Division of Ser. No. 828,309, May 27, 1969, which is a division of Ser. No. 627,832, April 3, 1967, Pat. No. 3,467,356, which is a division of Ser. No. 328,731, Dec. 6, 1963, Pat. No. 3,333,812.

[52] U.S. Cl. ............251/164, 251/192, 251/288, 251/309, 251/314
[51] Int. Cl. .....................................F16k 5/02
[58] Field of Search.........................251/164, 165

[56] References Cited

UNITED STATES PATENTS

| | | | |
|---|---|---|---|
| 2,376,975 | 5/1945 | Morgan | 251/165 |
| 2,615,672 | 10/1952 | Hinrichs | 251/309 |
| 3,066,908 | 12/1962 | Floren | 251/283 X |

FOREIGN PATENTS OR APPLICATIONS

| | | | |
|---|---|---|---|
| 730,366 | 5/1955 | Great Britain | 251/164 |
| 917,687 | 2/1963 | Great Britain | 251/164 |

Primary Examiner—Harold W. Weakley
Attorney—Cushman, Darby & Cushman

[57] ABSTRACT

A tapered rotary plug valve having a resilient O-Ring secured to the periphery of an axial section of the valve plug and surrounding the plug port so as to contact the opposed surface of the valve seat.

14 Claims, 14 Drawing Figures

Patented Aug. 29, 1972

INVENTOR
FRANK H. MUELLER

BY Cushman, Darby & Cushman

ATTORNEYS

Patented Aug. 29, 1972

INVENTORS
FRANK H. MUELLER

BY Cushman, Darby & Cushman
ATTORNEYS

Patented Aug. 29, 1972

INVENTOR
FRANK H. MUELLER

BY Cushman, Darby & Cushman
ATTORNEYS

INVENTOR
FRANK H. MUELLER

BY Cushman, Darby & Cushman
ATTORNEYS

Patented Aug. 29, 1972

INVENTOR
FRANK H. MUELLER

BY Cushman, Darby & Cushman

ATTORNEYS

ROTARY PLUG VALVE

REFERENCE TO RELATED APPLICATION

This application is a division of application, Ser. No. 828,309, filed May 27, 1969, which is a division of application, Ser. No. 627,832, filed Apr. 3, 1967, now U.S. Pat. No. 3,467,356 which in turn is a division of application, Ser. No. 328,731, filed Dec. 6, 1963, now U.S. Pat. No. 3,333,812.

The present invention relates generally to rotary plug valves and more partivularly to an improved tapered rotary plug valve. Valves of the type contemplated in the instant invention are commonly used in supply lines for domestic gas, usually being connected into the line ahead of the gas meter, sometimes exteriorly of the dwelling. Valves thus employed are commonly referred to as meter stops. It will be realized, however, that the invention is applicable to valves adapted for other uses.

Obviously, it is highly desirable that the valve plug of a meter stop be easily movable between its open and closed positions without impairment of its sealing function. In the past, efforts to provide a tapered rotary plug valve construction wherein the valve plug was easily movable between its open and closed positions have met with only limited success.

Typically, these prior efforts included constructions wherein a lubricant was introduced between metal-to-metal scaling surfaces of the plug and its seat or wherein the tapered metal plug was moved away from the metal seating surface when the valve was opened and was forced tightly against the seating surface when the valve was closed. Not only was considerable effort necessary to produce the necessary closing load on the seating surfaces in the latter construction, but there were also several additional drawbacks inherent in such prior constructions. Thus, the considerable force necessary to effect a tight seal between the metal-to-metal sealing surfaces so as to prevent through leaks not only rendered operation of the valve difficult, but frequently also caused distortion of the valve seat with consequent and leaks. Such prior constructions were relatively costly, requiring not only lapping of the metallic valve sealing surfaces but also the use of grease or other sealants to provide a pressure tight shutoff in the closed position of the valve. Furthermore, movement of the plug away from the valve seat when the valve was opened resulted in the separation of the mating sealing surfaces and the consequent undesirable exposure of such surfaces to the possibly corrosive action of the line fluid.

Similarly, it is particularly desirable when such valves are employed as outside meter stops, where they will be exposed to the corrosive action of the elements, that such exposure not impair operation of the valve. In addition, it is clearly desirable to prevent unauthorized disassembly or tampering with a meter stop to a degree which will cause leakage of gas to the atmosphere. Past experience has shown that meter stops oftentimes are tampered with by removing the plug-retaining means, thereby permitting the valve plug to be removed from its seat. Such unauthorized disassembly not only may damage the valve assembly and thus impair its subsequent operation, but also, and of greater importance, results in gas leakage with the consequent danger of explosion. Prior efforts have also been made to render meter stops tamper-proof to an extent where they could not be disassembled with conventional tools, e.g., wrenches and pliers, usually available to a householder. These prior efforts, however, frequently have resulted in relatively complicated and cumbersome valve constructions which are both costly to produce and difficult to assemble. In addition, it is necessary that a tamper-proof valve construction be such as to not only discourage unauthorized disassembly, but also not unduly restrict or hinder assembly or required disassembly by authorized persons. Furthermore, in other applications wherein there is frequent operation of the valve, it is desirable that the valve construction be such as to permit adjustment of the valve assembly so as to readily compensate for wear.

Accordingly, a principal object of the present invention is to provide an improved tapered rotary plug valve.

Another object of the present invention is to provide a tapered rotary plug valve wherein the seating force necessary to effect a pressure tight seal in the closed position of the valve is less than that necessary to effect a corresponding seal in conventional tapered rotary plug valve constructions employing metal-to-metal seating so that distortion of the valve seat and consequent end leaks are eliminated and the valve is easily operated between its open and closed positions.

A further object of the present invention is to provide a tapered rotary plug valve which is pressure tight in the closed position without the use of grease or other sealants and which requires no lapping of the sealing surfaces.

Another object of the present invention is to provide a tapered rotary plug valve of simple construction which is easily turned between its open and closed positions and which, at the same time, excludes line fluid from contact with the sealing surfaces of the valve when the latter is in open position.

An additional object of the present invention is to provide a rotary plug valve that is of improved tamper-proof construction.

A still further object of the present invention is to provide a tapered rotary plug valve of simple construction which not only has improved operating characteristics but also is tamper-proof, i.e., the plug cannot readily be removed from the valve body with ordinary tools, and also is of a construction which is readily assembled in the first instance.

A still further object of the present invention is to provide a tapered rotary plug valve adapted for use as an outside meter stop having a simple construction which not only is tamper-proof but also is adapted to withstand exposure to the elements.

Another object of the present invention is to provide an easily assembled tamper-proof tapered rotary plug valve which combines in one element both a tamper-proof function and a rotation limiting function, i.e., limiting rotational movement of the plug while at the same time facilitating the rotational movement of the plug within the predetermined limits.

A still additional object of the present invention is to provide a tapered rotary plug valve which is readily adjustable so as to compensate for wear.

Another object of the present invention is to provide a tapered rotary plug valve wherein optimum seating pressure between the plug and its seat is readily effected.

A still further object of the present invention is to provide a method of assembling a tapered rotary plug valve so as to effect optimum seating pressure of the plug in its seat.

Other objects and advantages of the invention will become apparent from the following description and accompanying drawings in which:

FIG. 14 is a side view, partly in section, showing a further modified form of the present invention.

Figures 1, 3:
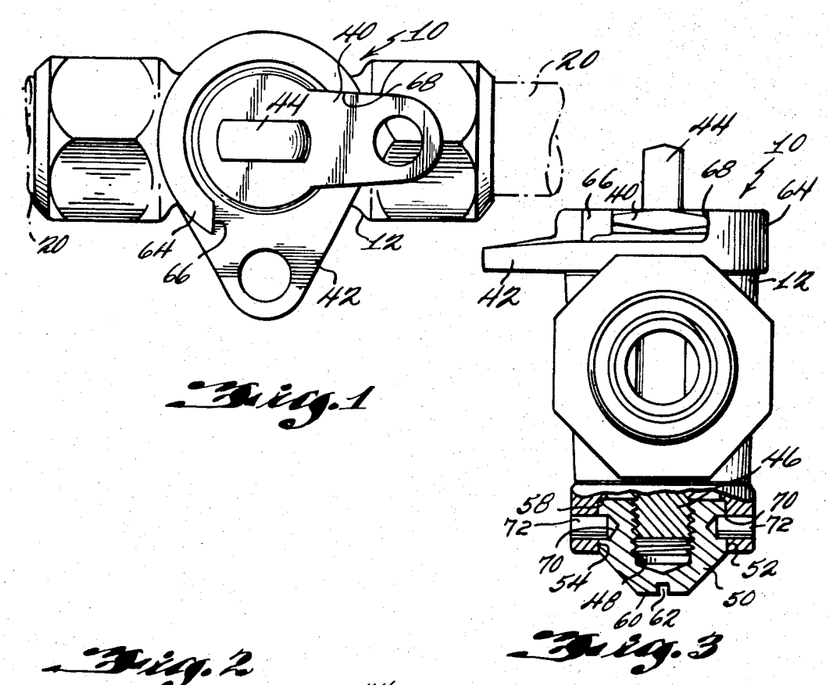
FIG. 1 is a plan view of a tapered rotary plug valve embodying this invention with the valve being shown in its open position.
FIG. 3 is an end elevation, partly in section, of the valve shown in FIG. 1.
Figure 2:
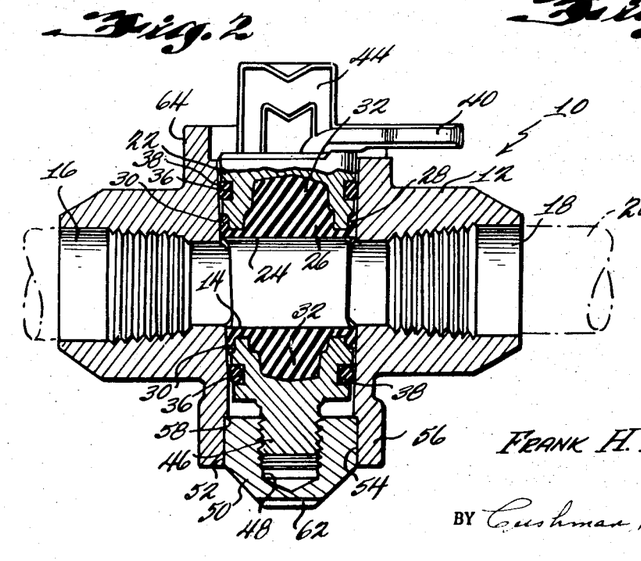
FIG. 2 is a side view, partly in section, of the valve shown in FIG. 1.

Referring now to FIGS. 1, 2 and 3 of the drawings, there is shown a tapered rotary plug valve 10 having a metal housing 12 provided with a tapered valve seat 14 having diametrically opposite inlet and outlet ports 16 and 18 respectively. The ports 16 and 18 may be interiorly threaded at their outer ends, as shown, for connecting the valve into a line 20 or may be provided with any other connecting means as are well known in the art. Rotatably mounted in the valve seat 14 is a correspondingly tapered metal valve plug 22. The valve plug 22 may be either a solid member or a hollow shell member, as illustrated in FIGS. 2, 4 and 5 and is formed with a diametric port 24 adapted to register with the seat ports 16 and 18 in the open position of the valve.

Figure 4:
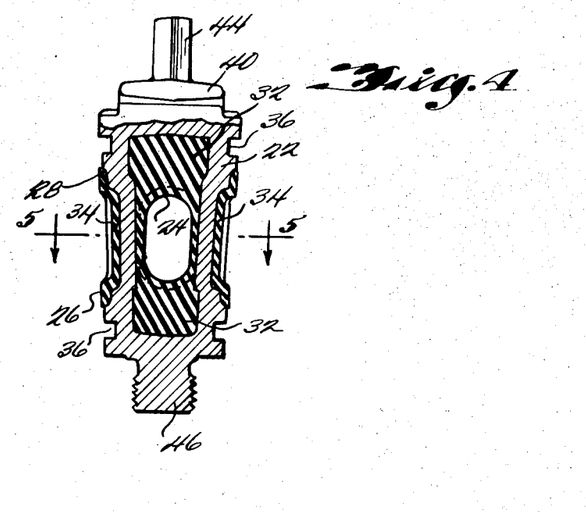
FIG. 4 is a side elevation, partly in section, of the valve plug employed in the valve shown in FIG. 1.
Figure 5:
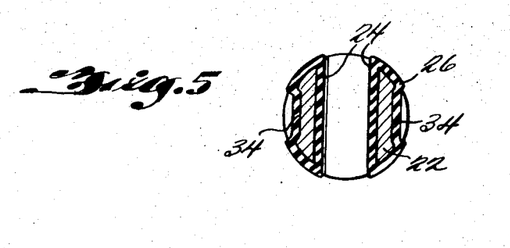
FIG. 5 is a sectional view taken along the line 5—5 of FIG. 4.

As best seen in FIGS. 2, 4 and 5, a central section of the valve plug 22 which includes the flow port 24 and extends axially beyond both sides thereof, is provided with a circumferential cover 26 of a suitable pressure deformable resilient material such as rubber or material having similar characteristics. The cover 26 is preferably molded in place on the plug 22, and for this purpose, the covered section of the plug preferably is of reduced diameter to provide an annular cover-receiving recess 28 defined at its ends by annular shoulders 30. In the embodiment best illustrated in FIGS. 2, 4 and 5, wherein a hollow or shell-like valve plug 22 is employed, the resilient cover material will be seen to have portions 32 extending interiorly and axially toward each end of the plug 22. In addition, these interior portions are formed so as to define or line the flow port.

The thickness in radial section of the cover 26 will be seen to be slightly greater than the depth of the recess 28 so that the cover 26 will extend radially outward of the annular shoulders 30. As will be more fully described hereinafter, the plug 22 will be moved axially in the direction of its larger end during rotation from the closed to the open position. The thickness in radial section of the cover 26 is such that the outer surface of the cover 26 will be in relatively light contact with the opposed sealing surface of the valve seat 14 when the valve is in the open position but will be compressed between the bottom of recess 28 and the opposed surface of valve seat 14 so as to form a fluid-tight seal therebetween when the valve is in the closed position.

Preferably, the bottom of the plug recess 28 is provided with diametrically opposed recesses which form false or blind ports 34 which are generally of the same configuration as the port 24 and are circumferentially located 90° therefrom.

As best seen in FIGS. 4 and 5, the cover 26, which is of uniform thickness except where it joins with the interior portions, lines these false or blind ports. In the closed position of the valve, the false ports 34 register with the seat ports 16 and 18. The provision of these false ports 34 both reduces the area of engagement between the cover 26 and the seat 14 to thus reduce resistance to turning movements of the plug and minimizes any tendency of the resilient cover 26 to bulge around the seat ports 16 and 18 as the valve is being closed.

As best seen in FIGS. 2 and 4, both ends of the valve plug 22 beyond the cover are provided with endless circumferential grooves 36 which are substantially rectangular in radial section. In these grooves 36 are disposed O-rings 38 of a suitable pressure-deformable resilient material adapted to sealingly engage the opposed surface of the valve seat 14. The use of such rings, either in grooves in the plug, as shown or in the seat to form seals between the plug end seat at both ends of the latter is well known in the art, being shown, for example in U.S. Pat. No. 2,653,791, so that no further details thereof need be described here.

The larger end of the plug 22 is provided with a laterally extending lock wing 40 having an aperture therein. The aperture in the lock wing 40 is alignable, in the closed position of the valve, with a corresponding aperture in a lock wing 42 on the housing 12, so that a suitable locking means such as a padlock, bolt, seal or the like (not shown) may be inserted through the apertures in both lock wings to lock the valve in its closed position. It should be noted that the lock wing 40 extends in a direction parallel to the direction of the flow port formed in the valve plug 22. Thus, since the lock wing 40 extends in a direction longitudinally of the housing, i.e., parallel to the direction of fluid flow when the valve is open and in a direction transversely of the housing when the valve is closed, the condition of service of the valve is readily determined by observation of the position of the lock wing 40 relative to the housing 12. The large end of the plug 22 is also provided with an axially outwardly extending non-circular portion 44 adapted to receive an appropriate turning tool (not shown), such as a wrench.

The small end of the plug 22 is provided with an axial retaining extension 46 which is threaded to mate with an interiorly threaded socket 48 formed in a plug-retaining cap nut 50. The retaining nut 50 is provided with a cylindrical exterior portion 52 which is adapted to be snugly and rotatably received in a cylindrical bore 54 formed in a housing extension 56 at the small end of the seat. The diameter of the bore 54 is slightly greater than the minimum diameter of the seat to provide an annular outwardly facing shoulder 58 against which the nut 50 engages to limit axial movement of the nut 50 inwardly of the bore 54. The outwardly facing end surface 60 of the nut 50 is provided with a kerf 62 adapted to be engaged by an appropriate turning tool (not shown), such as a screw driver.

As best seen in FIGS. 1, 2 and 3, the large end of the seat 14 is provided with a housing extension 64 of enlarged interior diameter which has a segment cut away to receive the laterally extending lock wing 40 and provide angularly spaced abutment surfaces 66 and 68 which are adapted to be alternatively engaged by the lock wing 40 to limit rotational movement of the valve plug 22 to 90° in turning between the open and closed positions.

In assembling the tapered rotary plug valve 10 just described, the plug 22 carrying the molded cover 26 is inserted in the valve seat 14 in the closed position. The nut 50 is screwed onto the plug retaining extension 46 until the plug 22 has been drawn down with sufficient force to effect the optimum compression of the cover 26 and the O-rings 38 between the plug 22 and the opposed surface of the seat 14 so as to provide a pressure-tight seal therebetween. Thereupon radial holes are drilled completely through the wall of the housing extension 56 and partially through the side of the nut 50 to provide blind sockets 70. Preferably, two such radially extending blind sockets at diametrically opposed locations are formed. Pins 72, which are of a slightly oversized diameter with respect to the diameter of the blind sockets 70 formed by the aligned holes in the nut 50 and extension 56, are driven into the sockets 70 to substantially permanently secure the nut 50 against movement relative to the housing extension 56. The rotational check formed by the lock wing 40 and abutments 66 and 68 limits rotational movement of the valve plug 22 to 90° between the open and closed positions, thus preventing unscrewing or disengagement of the valve plug retaining extension 40 from the threaded socket 48 of the nut 50 and thereby provides a tamper-proof valve assembly of simple construction. In order to disassemble the valve, it would be necessary to drill out the pins 72 so that the nut 50 could be unscrewed from the plug-retaining extension 46, an operation not normally performed by a householder.

The mating threads formed on the retaining extension 46 and in the socket 48 are of a relatively high pitch. Hence, as the plug 22 is turned from the closed toward the open position, the plug 22 will undergo an unseating movement, i.e., move axially relative to the seat 14 toward the larger end thereof. Such unseating movement progressively reduces the compression of the cover 26 and the O-rings 38 between the valve plug 22 and the opposed surfaces of the valve seat 14 and thus rapidly and progressively reduces the resistance to rotation of the plug 22 relative to the valve seat 14. As aforementioned, however, the thickness in radial section of the cover 26 is such that the outer surface of the cover will be in relatively light contact with the opposed surface of the valve seat 14 when the valve is in the open position and will be progressively compressed firmly between the plug 22 and seat 14 during seating movement of the plug, i.e., movement of the plug toward the small end of the seat, so as to form a fluid-tight seal when the valve is in the closed position. Thus, the increment in clearance between the plug 22 and seat 14 resulting from the axial movement of the plug 22 relative to the seat 14, as the plug moves from closed to open position, will represent the amount of compression of the cover necessary to effect a pressure-tight seal between the plug 22 and the seat 14.

While the compression of the O-rings 38 also will diminish as the plug 22 moves axially relative to the seat 14 and toward the larger end thereof, in turning from closed to open position, the thickness in radial section of the O-rings is such that they will effectively provide fluid-tight end seals between the valve plug 22 and the seat 14 in both the open and closed positions of the valve. In fact, even if the O-rings are only slightly compressed radially in the open position of the valve, it has been found that they still will be pressure-responsive and effect tighter seals with increasing pressure. It should also be noted that the pitch of the mating threads formed on the retaining extension 46 and in the threaded socket 48 is such that when the valve is in the open position, the flow port 24 in the valve plug 22 will substantially register with the ports 16 and 18 formed in the housing 12.

Figures 6, 7, 11:
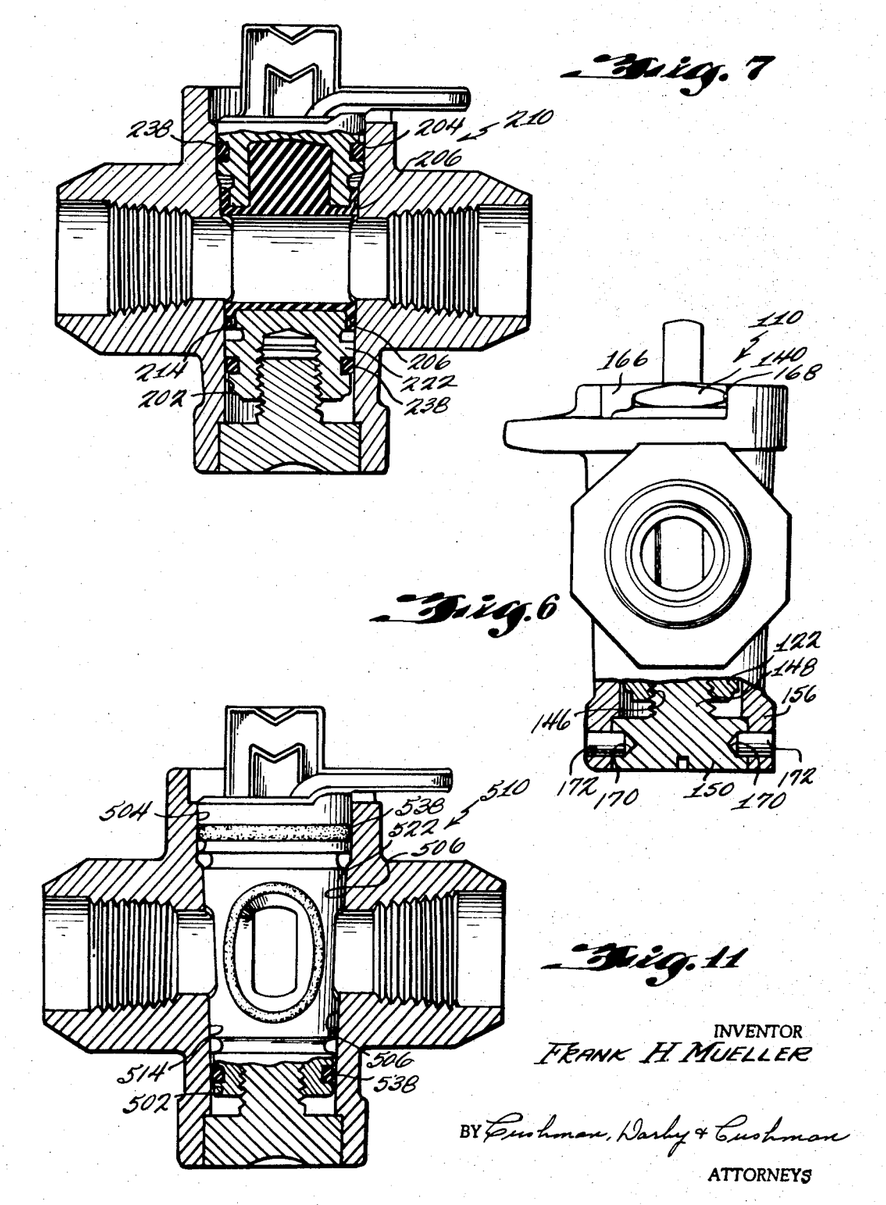
FIG. 6 is an end elevation, partly in section, showing a modified form of the present invention.
FIG. 7 is a side view, partly in section, illustrating another modified form of the present invention.
FIG. 11 is a side view, partly in section, showing a further modified form of the present invention.

Referring now to FIG. 6 of the drawings, there is shown a modified form of valve 110 embodying the invention. The construction of the valve 110 differs from that of valve 10, just described, in that the smaller end of the valve plug 122 is provided with an interiorly threaded socket 146 adapted to threadingly receive a matingly threaded stud 148 provided on a plug retaining member 150. As was the case with the embodiment shown in FIGS. 1, 2 and 3, the valve 110 of FIG. 6, when assembled, will be tamper-proof since the member 150 will be secured relative to the housing 156 by means of pins 172 in blind sockets 170 and the alternative engagement of the lock wing 140 with the shoulders 166 and 168 formed on the valve housing will prevent disengagement of the threaded plug socket 146 from the threaded retaining extension 148.

Referring now to FIG. 7 of the drawings, there is shown another modified form of a valve 210 embodying the invention. The construction of the valve 210 differs from the valve 10 in that in addition to employing the modified plug retaining arrangement just described by reference to FIG. 6, the O-rings carried by the valve plug 222 are disposed within cylindrical bore sections 202 and 204 coaxially with and provided at the smaller and larger ends, respectively, of the tapered section 206 of the valve seat 214. Correspondingly, those sections of the plug on opposite sides of the cover which carry the O-rings are exteriorly cylindrical and complementary to the respective bore sections. The cylindrical bore sections 202 and 204 are of such axial extent that the O-rings 238 will be maintained under a constant compression and consequently be of constant sealing effect throughout the axial movement of the plug 222 relative to the seat 214 resulting from rotation of the plug 222 between its open and closed positions.

Alternatively, if the O-rings providing end seals are disposed in circumferential grooves formed in the valve seat as aforementioned, the plug 222 can be provided with smooth-surfaced cylindrical sections (not shown) adapted to sealingly engage such O-rings to thereby maintain the O-rings under constant compression during axial movements of the plug.

Figure 8:
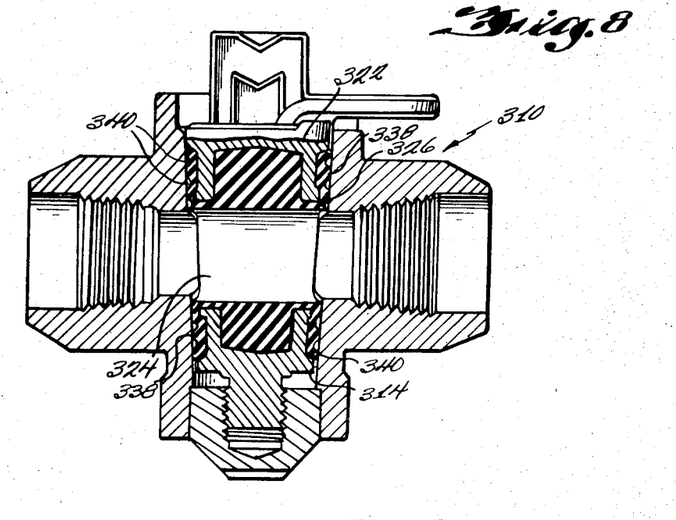
FIG. 8 is a side view, partly in section, showing still another modified form of the present invention.
Figures 9, 10:
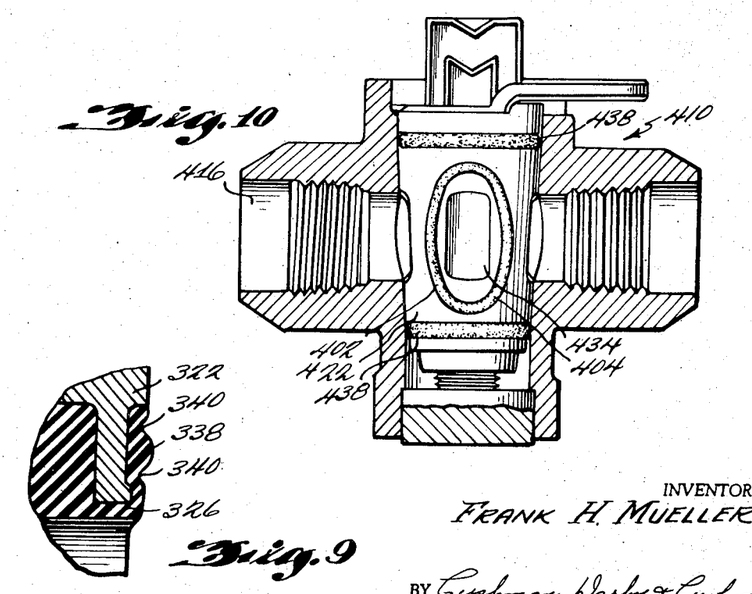
FIG. 9 is an enlarged, fragmentary view of the modification illustrated in FIG. 8.
FIG. 10 is a side view, partly in section, showing another modified form of the present invention.
Figure 11:
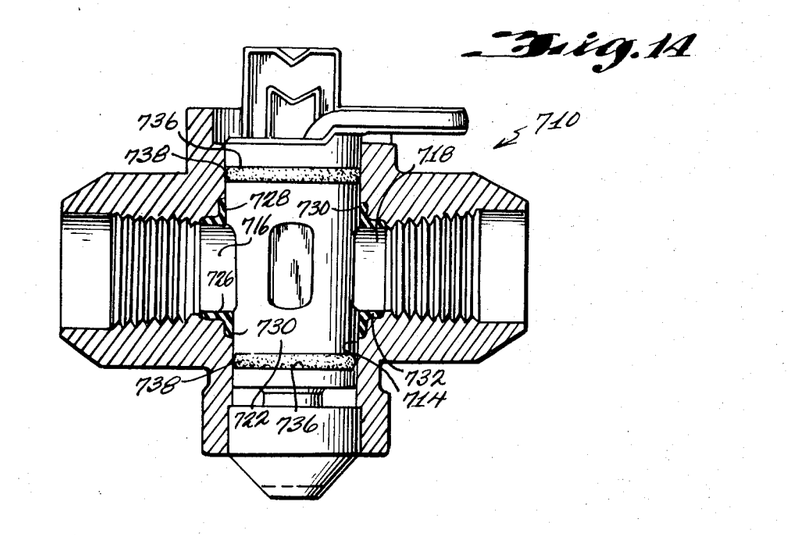

Referring now to FIGS. 8 and 9 of the drawings, there is shown another modified form of a valve 310 embodying the invention. The construction of the valve 310 differs from that of the valve 10, previously described, in that the molded resilient cover 326 has been extended axially at each end and formed with integral annular circumferential projections 338 axially spaced above and below the flow passage 324 and in fluid-tight sealing engagement with the opposed surface of the tapered valve seat 314 to provide end seals between the valve plug 322 and the seat 314. Such a construction is a substitute for and permits elimination of O-ring seals adjacent each end of the valve plug as well as the annular O-ring receiving grooves. As best shown in FIG. 9, the outer surface of each projection 338 is semi-circular in radial section and, preferably, the cover 326 is provided with circumferential grooves 340 on each side of and closely adjacent each projection 338 to accentuate the protrusion thereof from the plug. By reason of this construction, the projections essentially act as O-rings in that they form pressure-responsive seals between the plug and seat adjacent the opposite end of the latter. Of course, this modification, just described by reference to FIGS. 8 and 9, can be employed with the modifications previously described by reference to FIGS. 6 and 7.

Reference is now made to FIG. 10 of the drawings wherein there is shown a further modified form of the valve 410 embodying the invention. The construction of the valve 410 differs from that of the valve 10 in that, in addition to employing the modified plug retaining arrangement above described by reference to FIG. 6, the resilient molded cover has been replaced by a different type of compressible seal. Surrounding that false port 434 of the valve plug 422 which is adapted to register with the housing inlet port 416 in the closed position of the valve is an endless groove 402 of uniform depth and generally rectangular in radial section. An O-ring 404 of suitable resilient material is disposed in the groove 402 for sealing engagement with the opposed surface of the valve seat 414 so as to form a tight seal between the seat 414 and the plug 422 about the inlet port 416 when the valve is closed. As in the valve 10, O-rings 438 disposed in circumferential grooves adjacent each end of the plug 422 provide fluid-tight end seals.

The thickness in radial section of the O-ring 404 is so proportioned that when the valve plug 422 is in its open position, the ring 404 still is compressed slightly between the bottom of its groove 402 and the opposed surface of the valve seat 414 so as to maintain the ring in operative position within the groove. When the plug 422 is turned to closed position, however, and so shifts axially toward the small end of the sect, it will be seen that the O-ring seat, will be compressed much more between the plug 422 and seat 414 so that when the plug is in is closed position, the O-ring 404 forms an extremely tight seal about the inlet port 416. In this same connection, it is not essential for the seal about the inlet port when the valve is closed to be pressure-responsive. For this reason, the packing in the groove 402 need not be circular in cross-section, nor need the groove 402 be rectangular in radial section. Consequently, the groove 402 which surrounds the false port 434 may be of any appropriate configuration in radial section and, similarly, the resilient packing ring may be molded directly into such groove so as to be more securely retained therein. Preferably, however, that portion of the packing ring which projects from the groove will be curved in radial section so as to more effectively prevent the ring from being displaced or pulled out of the plug groove 402 in turning movements of the plug between opened and closed position. Of course, the ring 404 should be thick enough in radial section to permit it to be compressed as the plug 422 moves from open to closed position so as to provide a tight seal about the inlet port 416 in the closed position.

Referring now to FIG. 11 of the drawings, there is shown another modified form of valve 510 embodying the invention. The construction of the valve 510 differs from the valve 410, just described, in that the O-rings 538 carried the valve plug 522 are disposed in cylindrical bore sections 502 and 504 provided at the smaller and larger ends of the valve seat 514, respectively, on opposite sides of the tapered section 506 of the seat. The cylindrical bore sections 502 and 504 are of such axial extent that the O-rings 538 will be maintained under a constant compression throughout the axial movement of the plug 522 relative to the seat 514 resulting from rotation of the plug 522 between its opened and closed positions. In this regard, the valve 510 is identical with the valve 210 shown in FIG. 7.

Figure 12:
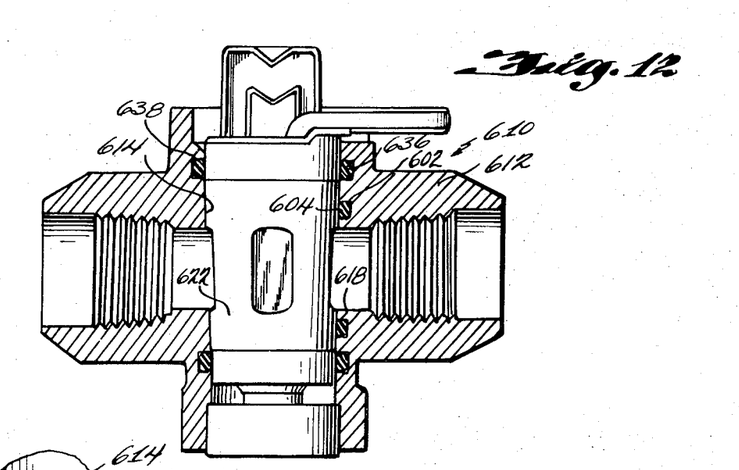
FIG. 12 is a side view, partly in section, showing still another modified form of the present invention.
Figure 13:
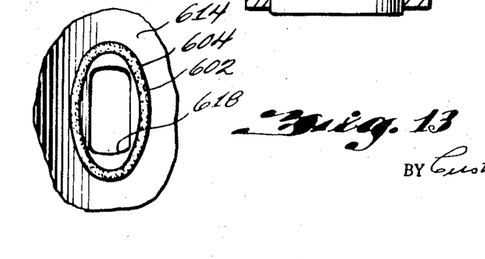
FIG. 13 is an enlarged, fragmentary view of the modification illustrated in FIG. 12.

Reference is now made to FIGS. 12 and 13 of the drawings wherein there is shown a further modified form of the valve 610 embodying the invention. The construction of the valve 610 differs from that of the valve 410, afore-described, in that in addition to employing the afore-mentioned modified end seal arrangement wherein the O-rings 638 are disposed in endless circumferential grooves 636 in the seat 614 adjacent each end thereof and are adapted to sealingly engage the opposed surface of the valve plug 614, the O-ring 604 is disposed in an endless groove 602 provided in the valve seat 614 surrounding the outlet port 618.

As in the valve 510, the thickness in radial section of the O-ring 604 is so proportioned that when the valve plug 622 is in its open position, the O-ring 604 is still compressed slightly between the bottom of its groove 602 and the opposed surface of the valve plug 614 so as to maintain the ring in operative position within the groove. When the plug 622 is turned to its closed position, however, and so shifts axially toward the small end of the seat, it will be seen that the O-ring 604 will be compressed much more between the plug 622 and the seat 614, so that when the plug is in its closed position, the O-ring 604 forms an extremely tight seal about the outlet port 618. As was the case with the O-ring 404 in the valve 410, it is not essential for the seal about the outlet port 618 when the valve is closed to be pressure responsive. Therefore, the packing in the groove 602 need not be circular in cross section nor need the groove 602 be rectangular in radial section. Thus, as in the valve 410, the groove 602 which surrounds the outlet port 618 may be of any appropriate configuration in radial section and, similarly, the resilient packing ring may be molded directly into such groove so as to be more securely retained therein.

Reference is now made to FIG. 14 of the drawings wherein there is shown a further modified form of the valve 710 embodying the invention. The construction of the valve 710 differs from that of the valve 10, aforedescribed by reference to FIGS. 1, 2 and 3 of the drawings, in that the central section of the valve seat 714 which includes the inlet and outlet ports 716 and 718 respectively and extends axially therebeyond toward both the large and small ends of the seat, is provided with a circumferential resilient cover 726. The cover 726 is preferably molded in place in the seat 714, and for this purpose the covered section of the seat is of increased diameter to provide an annular cover-receiving recess 728 of uniform diameter and defined at its ends by annular shoulders 730. In the embodiment illustrated, the resilient cover material will be seen to have portions 732 extending axially into the inlet and outlet ports 716 and 718 respectively so as to line the same. As in the valve 10, the thickness in radial section of the cover 726 is slightly greater than the depth of the recess 728 so that the cover will extend radially inward of the shoulders 730. The thickness in radial section of the cover 726 is thus such that the cover 726 will be in relatively light contact with the opposed sealing surface of the valve plug 722 when the valve is in the open position but will be compressed between the bottom of recess 728 and the opposed surface of valve seat 714 so as to form a fluid-tight seal therebetween when the valve is in the closed position. As in the valve 10, O-rings 738 disposed in circumferential grooves 736 adjacent each end of the plug 722 provide fluid-tight end seals.

While in each of the foregoing embodiments of the invention the retaining nut or member has been secured to the valve housing by means of pins driven into blind sockets in the nut or member through holes in the housing extension, the holes formed in the housing extension may instead be threaded so as to receive suitable set screws (not shown), adapted to firmly engage the cylindrical exterior surface of the retaining nut or member and thereby retain the same in fixed but adjustable relation to the valve housing. Such a construction, utilizing set screws, permits adjustment of seating force between the plug and seat so as to compensate for wear. Adjustment is readily accomplished by merely loosening the set screws, turning the retaining nut the desired amount to compensate for any wear, and then resetting the set screws.

Furthermore, while the foregoing tamper-proof constructions have been illustrated in connection with tapered rotary plug valves, it will be apparent to those skilled in the art that such tamper-proof constructions are applicable to other valve constructions such as the well-known cylindrical rotary plug valve construction.

It should be noted also that each of the foregoing embodiments of the invention are of a weather-proof construction. That is, exposure to the corrosive action of the elements will not impair operation of the valve since the various sealing surfaces which must move relative to one another during operation of the valve between its open and closed positions are enclosed within the valve housing and protected by O-rings from access by the elements. In addition, the interengaged surfaces of the retaining nut or member and the plug wherein relative movement occurs during operation of the valve are also enclosed and thus protected from access by the elements.

It should be further noted that in each of the foregoing embodiments of the invention, the seating of the valve plug within the seat is effected by resilient means interposed therebetween. The utilization of such resilient means to effect seating of the plug in the valve seat not only eliminates the necessity of providing lapped sealing surfaces but greatly facilitates operation of the valve between its open and closed positions.

It will thus be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

I claim:

1. A rotary plug valve comprising: a housing member having a circular tapered valve seat provided with at least one flow port; a tapered plug member rotatable in said seat and having a flow passage terminating in at least one radial port movable into or out of registration with said seat port to open or close the valve; a resilient endless packing ring interposed between the opposed surfaces of said members and secured to one of said members, said endless packing ring being arranged to surround said seat port in the closed position of the valve; pressure-responsive sealing ring means carried by one of said members and interposed between said opposed surfaces adjacent each end of said seat to effect a pressure tight seal between said members at each end of said seat in all operative positions of said plug member; and interengaged means associated with said members for retaining said plug member in operative relation with said seat and for effecting axial seating movement of said plug member relative to said seat during rotation of said plug member from its open to its closed position and unseating movement during rotation from its closed to its open position, said resilient endless packing ring being compressed between said opposed surfaces to provide a fluid-tight seal therebetween when the valve is in said closed position and the compression of said resilient endless packing ring being progressively reduced as said plug member is rotated from said closed to said open position.

2. The structure defined in claim 1 including check means associated with the members operative to limit rotation of the plug member to movement between the open and closed positions, and wherein the interengaged means is disengageable by rotation of said plug member through an angle greater than that through which said plug member rotates in moving between said open and closed positions, whereby removal of said plug member from said operative relation with said valve seat is effectively thwarted.

3. The structure defined in claim 2 wherein the interengaged means is disposed adjacent the smaller end of the seat and includes threads integral with the plug member, a retaining member rotatably carried by the housing member and having threads engaged with said plug threads, and means securing said retaining member against movement relative to said housing member, and the check means includes angularly spaced abutments integral with said housing member and disposed adjacent the larger end of said seat and radial projection means integral with said plug member and alternatively engageable with said abutments.

4. The structure defined in claim 3 wherein the housing member is provided with an annular extension at the small end of the valve seat and the retaining member is received at least partially within said extension and including mutually engaged means on said retaining member and said housing member for limiting the extent of movement of said retaining member into said extension.

5. The structure in claim 4 wherein the securing means includes pin means extending with a drive fit through a hole in the extension and at least partially into the retaining member.

6. The structure defined in claim 4 wherein the securing means includes a set screw threaded through the extension and engaged with the retaining member.

7. The structure defined in claim 1 wherein the resilient endless packing ring is disposed within an endless groove in the surface of the plug.

8. The structure defined in claim 7 wherein the packing ring comprises an O-ring and the groove is generally rectangular in radial section.

9. The structure defined in claim 1 wherein the resilient endless packing ring is disposed within an endless groove in the valve seat surrounding the seat port.

10. The structure defined in claim 9 wherein the packing ring comprises an O-ring and the groove is generally rectangular in radial section.

11. The structure defined in claim 1 wherein the pressure-responsive sealing ring means are individual O-rings disposed in circumferential grooves in the one member and are compressed between the bottoms of said grooves and the opposed surface of the other member to provide a tight seal between the plug member and seat at each end of the latter in all positions of rotation of said plug member.

12. The structure defined in claim 11 in which the opposed surface of the other member is provided adjacent each end thereof and beyond a central tapered section with cylindrical sections of uniform diameter constantly engaged by the corresponding individual O-rings during axial movements of the plug member to thereby maintain a constant degree of physical compression of each O-ring between said members during said movements.

13. The structure defined in claim 1 wherein the valve seat includes an inlet port and an outlet port and the resilient endless packing ring is disposed within an endless groove in the surface of the plug and arranged to surround said inlet port of said seat in the closed position of the valve.

14. The structure defined in claim 1 wherein the valve seat includes an inlet port and an outlet port and the resilient endless packing ring is disposed within an endless groove in the valve seat surrounding said outlet port of said seat.

* * * * *